United States Patent [19]

Winner

[11] Patent Number: 5,538,167

[45] Date of Patent: Jul. 23, 1996

[54] HOLDER FOR SECURING A BICYCLE ACCESSORY TO A BICYCLE FRAME

[75] Inventor: Kevin D. Winner, Hermitage, Pa.

[73] Assignee: Winner International Royalty Corporation, Sharon, Pa.

[21] Appl. No.: 398,496

[22] Filed: Mar. 3, 1995

[51] Int. Cl.$^6$ .................................................. B62J 11/00
[52] U.S. Cl. .......................... 224/425; 224/935; 224/446; 224/448; 224/458; 248/229.14
[58] Field of Search ............................... 224/30 R, 31, 224/37, 38, 39, 40, 41, 42; 248/229, 316.4, 227, 231.2, 221.4; 70/233; 280/288.4

[56] References Cited

U.S. PATENT DOCUMENTS

| | | | |
|---|---|---|---|
| 2,531,902 | 11/1950 | Baron | 224/32 A |
| 2,666,612 | 1/1954 | Howell | 248/229 |
| 3,967,475 | 7/1976 | Zane | 70/18 |
| 4,155,231 | 5/1979 | Zane | 70/18 |
| 4,436,232 | 3/1984 | Zane et al. | 224/39 |
| 4,736,921 | 4/1988 | Zane | 248/316.2 |
| 5,076,526 | 12/1991 | Zane | 248/314 |
| 5,127,562 | 7/1992 | Zane et al. | 224/37 |
| 5,395,016 | 3/1995 | Minoura | 224/39 |

FOREIGN PATENT DOCUMENTS

| | | | |
|---|---|---|---|
| 736565 | 11/1932 | France | 248/316.4 |
| 131717 | 3/1951 | Sweden | 224/37 |
| 18309 | 8/1912 | United Kingdom | 224/40 |

*Primary Examiner*—Henry J. Recla
*Assistant Examiner*—Gregory M. Vidovich
*Attorney, Agent, or Firm*—Vickers, Daniels & Young

[57] ABSTRACT

A frame mounted holder for releasably securing a bicycle lock or other accessory to the frame of a bicycle has a pair of spaced apart, oppositely facing hook members for engaging the lock or other accessory, which hook members are biased away from one another to hold the lock or accessory at a pair of spaced apart points.

35 Claims, 5 Drawing Sheets

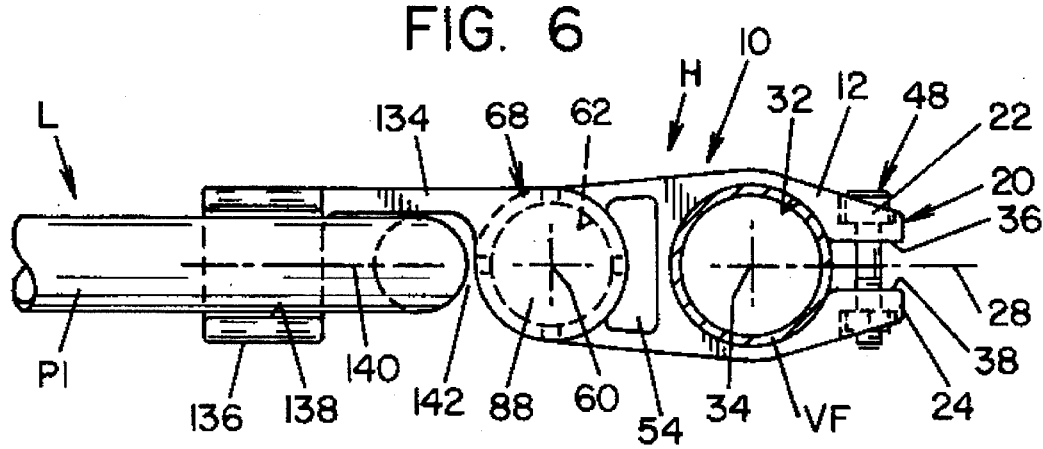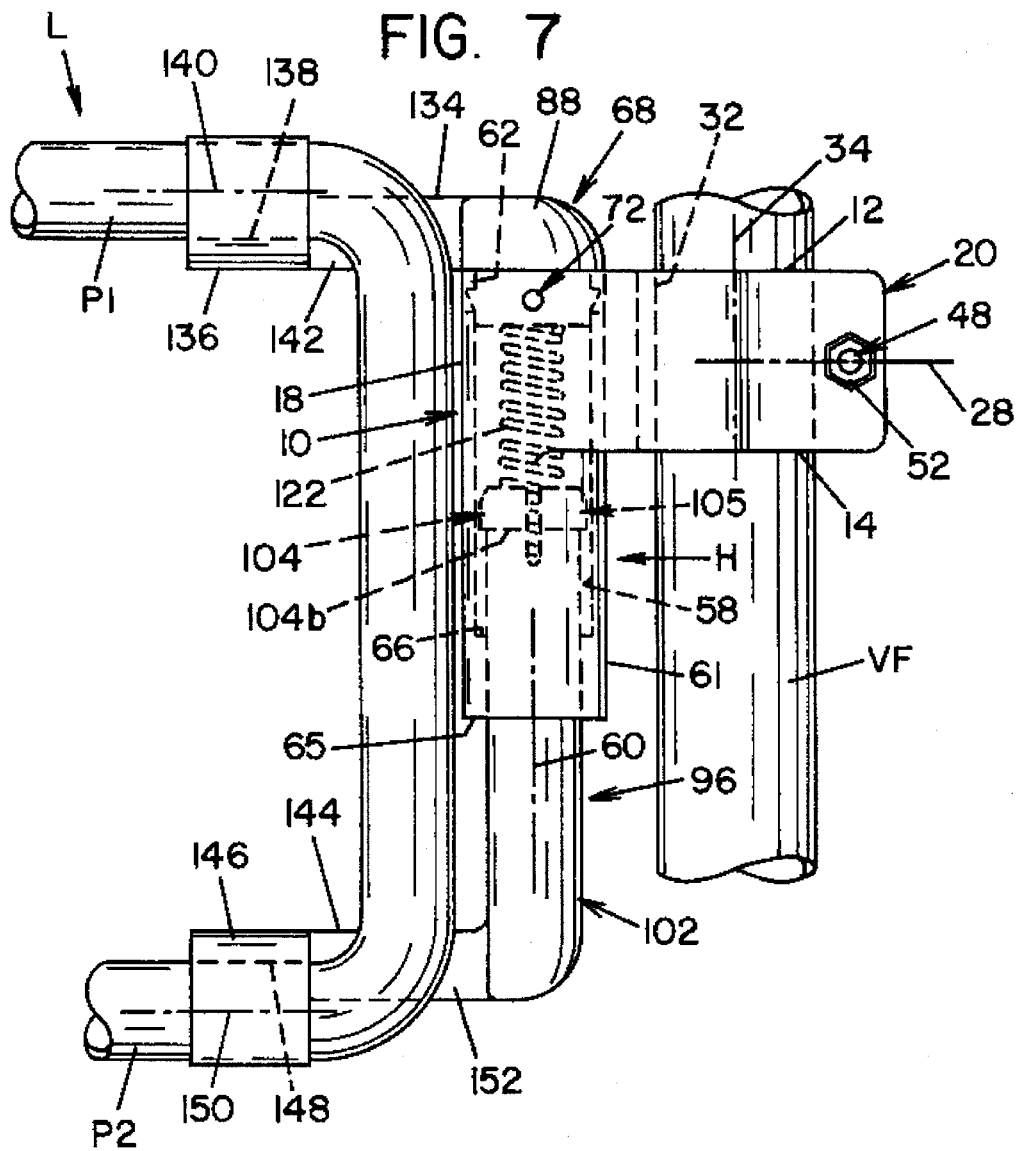

HOLDER FOR SECURING A BICYCLE ACCESSORY TO A BICYCLE FRAME

The present invention is directed toward a holder for securing a bicycle accessory to a bicycle frame and, more specifically, to a holder for securing a bicycle accessory to a bicycle frame and having a pair of spaced apart hooks for engaging portions of the accessory.

BACKGROUND OF THE INVENTION

Bicycles are a popular form of transportation, especially in urban areas where traffic congestion and limited parking can make driving a motor vehicle impractical. Unfortunately, it is in these busy areas that bicycle thefts are most likely to occur.

To combat these thefts, it is necessary to lock unattended bicycles to a fixed object, or to lock a bicycle wheel to the bicycle frame, or preferably both. This has traditionally been accomplished by passing a chain or cable through the bicycle frame, one or both wheels and around a fixed object. While such cables and chains are relatively easy to transport, they are also relatively easy to defeat with an inexpensive hacksaw or bolt cutter. To better secure a bicycle, therefore, many manufacturers now sell a lock made of a generally U-shaped metal bar which can be passed through a frame and a locking portion for locking the U-shaped bar around a fixed object as described above. Such locks are much more difficult to defeat than the traditional chain or cable; however, they are rigid and thus more difficult to store than a traditional, flexible chain or cable.

The prior art contains many devices for fastening a lock to a bicycle frame, but most are limited to use with locks having certain dimensions. For example, Zane 3,967,476, Zane, 4,155,231, Zane 4,736,921 and Zane 5,076,526 all teach holders for mounting a lock having a particular shape or cross-section. If such a lock breaks or is lost, the owner must either purchase an identical replacement lock or replace both the lock and its holder. This limits the bicycle owner's freedom of choice and prevents him from using a different lock for even a short period of time. It would, therefore, be desirable to provide a holder which could be used with a wide variety of bicycle locks and even used to carry other bicycle accessories.

SUMMARY OF THE INVENTION

These and other problems are addressed by the subject invention which is directed toward a holder for a bicycle lock or other accessory and which is designed to securely hold a variety of different bicycle locks. The holder includes a circular opening for receiving a portion of a bicycle frame and a fastener such as a nut and bolt for closing the opening around the frame. The opening is connected to a tubular housing which holds and maintains a separation between a pair of oppositely facing hooks which are designed to hold a bicycle lock. These hooks can be moved between a first position in which a bicycle lock can be placed in the holder and a second position in which the lock is secured in the holder. The lock can be easily removed by reversing the process, and no keys, clamps, screws or other mechanisms are needed to fasten or unfasten the lock to the holder.

It is therefore a principal object of the present invention to provide a holder for attaching a wide variety of objects to a bicycle frame.

It is a further object of the present invention to provide a holder for a bicycle lock which can be used to hold a variety of different types of locks.

It is yet a further object of the present invention to provide a bicycle lock holder which allows a lock to be rapidly attached to and removed from a bicycle frame.

It is another object of the present invention to provide a bicycle lock holder which can be operated without a key.

It is still another object of the present invention to provide a bicycle lock holder which can be attached to the frame of a bicycle such that when attached, the holder does not interfere with the normal use of the bicycle.

BRIEF DESCRIPTION OF THE DRAWINGS

These and other objects of the invention will become apparent from the following detailed description of preferred embodiments of the invention when read in connection with the following drawings, of which:

FIG. 6 is a plan view, partially in section, of a third embodiment of the holder of the present invention; and FIG. 7 is a side elevation view of the embodiment shown in FIG. 6.

DETAILED DESCRIPTION OF THE PREFERRED EMBODIMENTS

Figure 1:
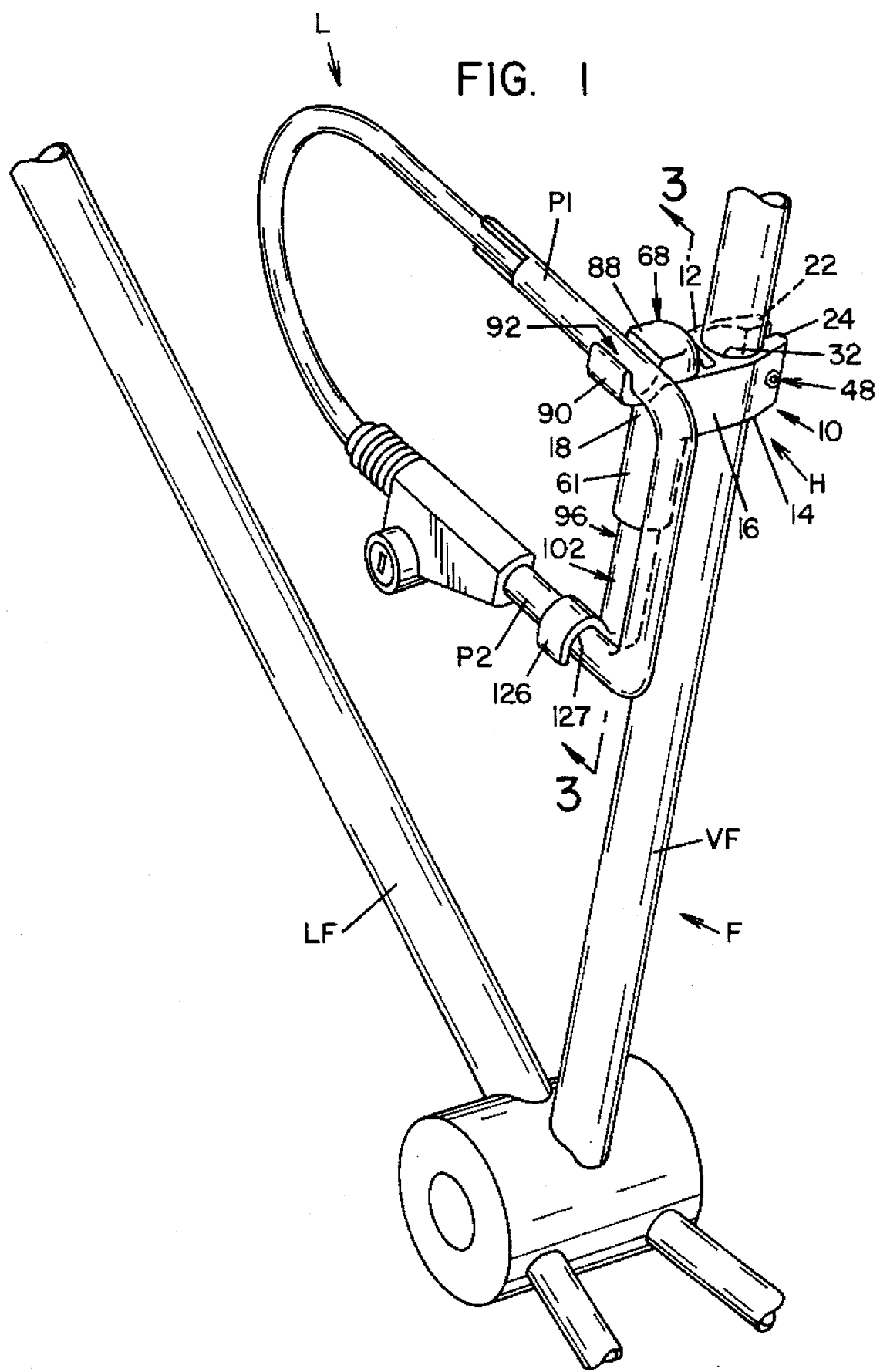
FIG. 1 is a perspective view of a holder according to the present invention attached to a bicycle frame and holding a bicycle lock.
Figure 2:
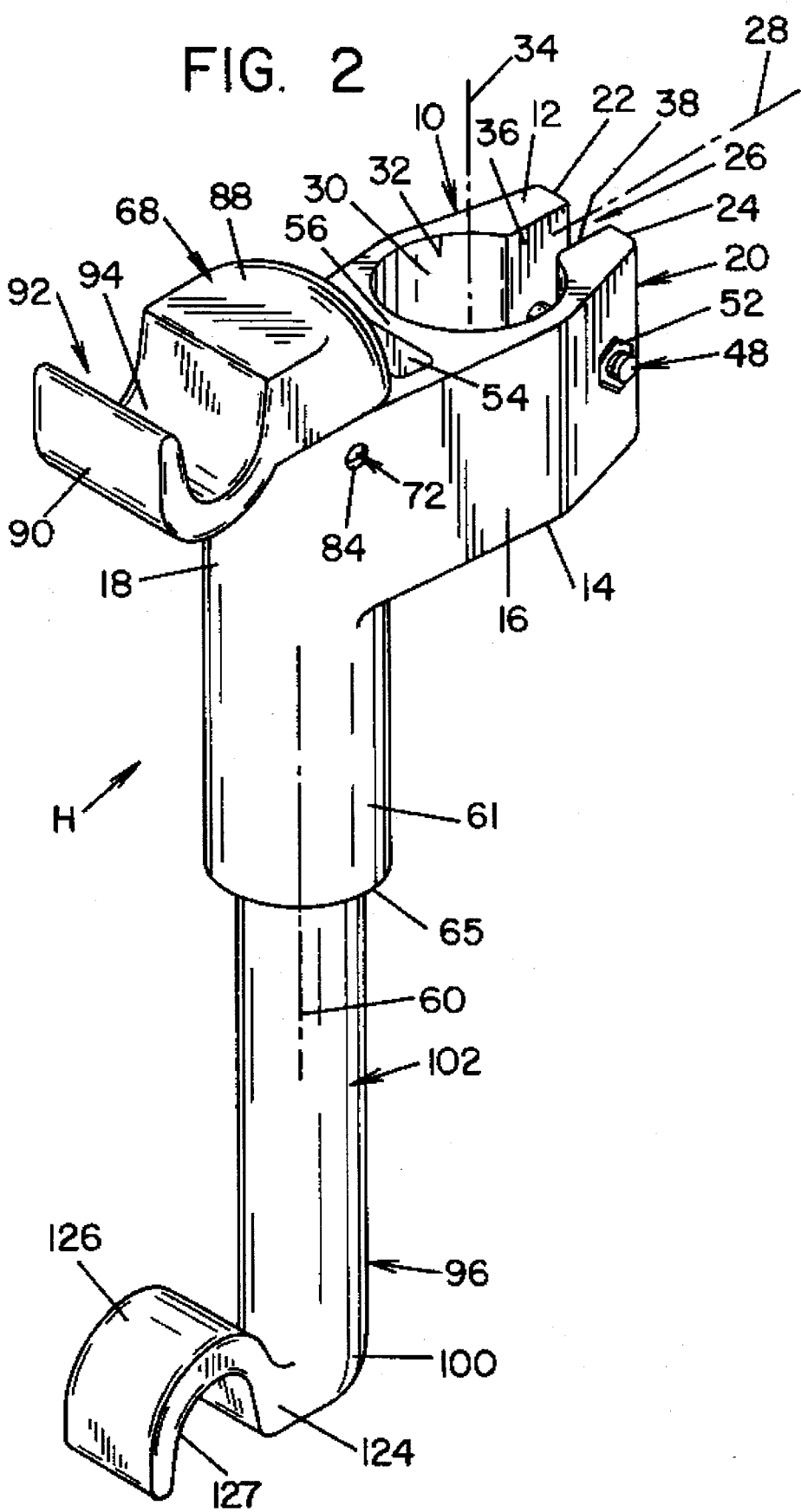
FIG. 2 is a perspective view of the holder shown in FIG. 1.

Referring now to the drawings wherein the showings are for the purpose of illustrating the preferred embodiments of the invention only and not for the purpose of limiting same, FIG. 1 shows a bicycle lock L attached to a holder H which in turn is attached to a vertical portion VF of the frame F of a bicycle. As best seen in FIG. 2, holder H includes a body portion 10 having a top 12 and a bottom 14 connected by a side surface 16 providing body 10 with a first, rounded end 18 and a second slotted end 20. Slotted end 20 is divided into a first jaw portion 22 and a second jaw portion 24 by a slot 26 and a centerline 28 runs through slot 26 in the direction from end 18 to end 20, dividing body portion 10 into two generally symmetrical halves. Body portion 10 further includes a first cylindrical opening 30 extending from top 12 to bottom 14 and having a generally cylindrical inner surface 32 and an axis 34 perpendicular to centerline 28. Slot 26 extends from end slotted 20 into opening 30. A first interior slot wall 36 connects first jaw portion 22 to opening 30 and a second interior slot wall 38 connects second; and portion 24 to opening 30.

Figure 3:
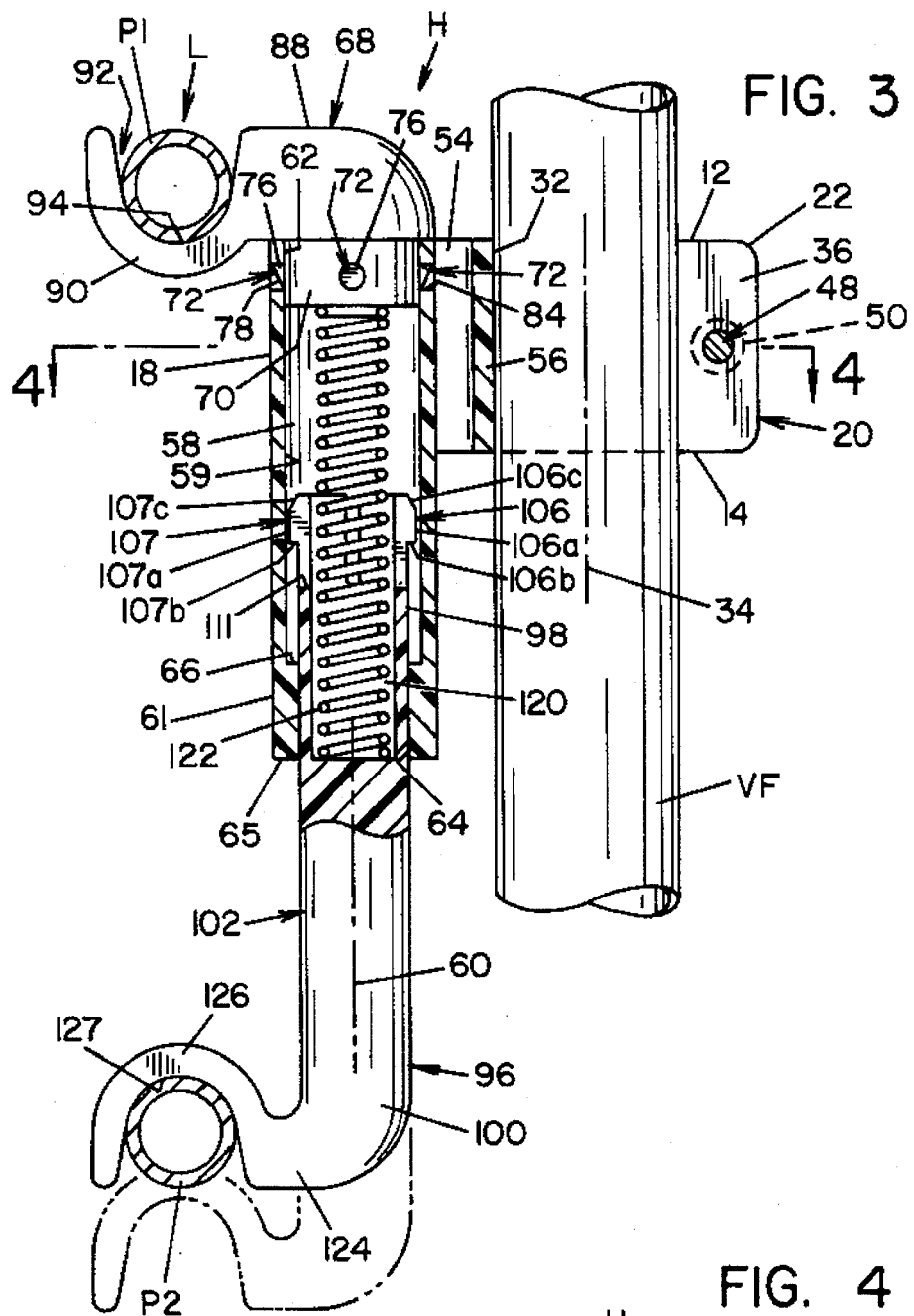
FIG. 3 is a side elevation view, partially in section, showing the holder of FIG. 1 holding a lock and showing in dashed lines the position of the holder when the lock is removed.
Figure 4:
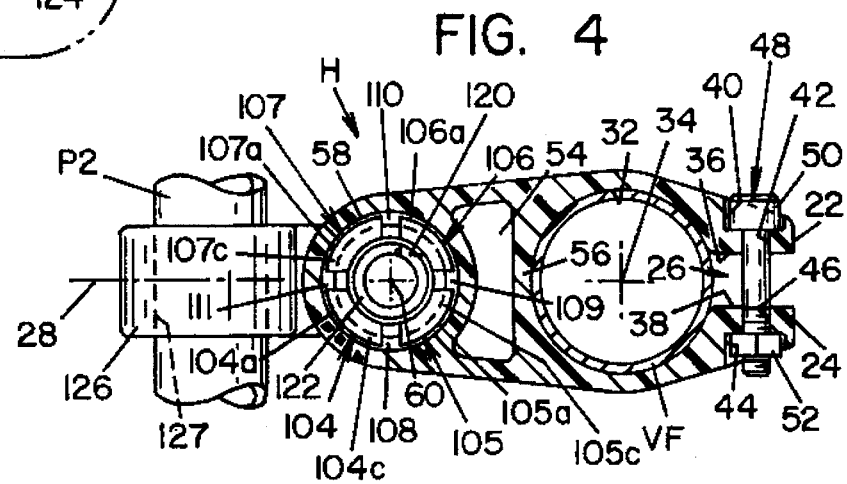
FIG. 4 is a plan view of the holder, in section, taken along line 4—4 in FIG. 3.

As can be seen in FIG. 4, first jaw portion 22 includes a countersink 40 near slotted end 20 around a hole 42 which extends from portion 22 into slot 26 through first interior slot wall 36. Second jaw portion 24 includes a countersink 44 near slotted end 20 around a hole 46 which extends from portion 24 into slot 26 through second interior slot wall 38. Hole 42 is aligned with hole 46 so that a bolt 48 having a head 50 can be passed through hole 42, across slot 26 and into hole 46. A nut 52 fits within countersink 44 and receives bolt 48 while head 50 of bolt 48 fits within countersink 40. The purpose of this arrangement will be described hereinafter in connection with the attachment of holder H to frame F. As best seen in FIGS. 3 and 4, body portion 10 also includes a narrow opening 54 between top 12 and bottom 14 and spaced apart from opening 30 in the direction of end wall 18 by an interior wall 56.

Holder H includes an extension 61 depending from bottom 14 of end 18 of body 10, and a circular passage 58 spaced apart from opening 30 and having a vertical axis 60 parallel to axis 34 of opening 30 extending downwardly through body 10 and extension 61. Passage 58 has an upper end 62 at top 12 and a lower end 64 opening from bottom end 65 of extension 61, which lower end has a smaller diameter to provide a stop shoulder 66.

A lock with which the holder is easily used is comprised of a U-shaped metallic rod and a U-shaped tube bent so that the ends thereof can be locked together. Such locks define a closed loop, portions of which are parallel to one another such as portions P1 and P2 in FIGS. 1 and 3. As described in detail hereinafter, holder H includes two spaced apart connectors having oppositely facing C-shaped channels. These channels engage the insides of portions P1 and P2 of the lock at spaced apart locations and are biased away from one another so that they are pushing against the inside of the lock in opposite directions. The biasing force must be overcome to remove the lock from the channels.

More specifically, as best seen in FIG. 3, the holder includes an upper connector designated generally by the numeral 68 attached to body portion 10 for engaging a first portion P1 of lock L to connect lock L to body portion 10 and hence to frame F. Upper connector 68 includes a base portion 70 which fits into circular passage 58 and has an outside diameter slightly less than the inside diameter of passage 58 so that base portion 70 fits snugly therein. Base portion 70 is provided with two pairs of tabs 72 which extend from diametrically opposite sides of the base portion. Each of the tabs 72 includes a horizontal top edge 76 and an angled side wall 78. These tabs interact with opposed pairs of circular openings 84 adjacent upper end 62 of opening 58 to connect connector 68 to body 10. Body portion 10 and connector 68 are preferably made from a material such as plastic which will deform slightly under pressure but return to its original shape when the pressure is removed. As base portion 70 is inserted into upper end 62, the angled side walls 78 contact the inner edge of opening 58 at top 12. Pressure is then applied to connector 68 and walls 78 deform the wall about opening 58 outwardly, whereby tabs 72 enter opening 58. When the top edge 76 of tabs 72 are aligned with openings 84, the tabs enter openings 84 and opening 58 returns to its original circular shape, locking upper connector 68 in opening 58. The openings 84 and tabs 72 interengage to prevent connector 68 from rotating with respect to body portion 10. Alternatively, a notch may extend around the interior surface 59 of opening 58 and receive tabs 72 so that connector 68 can rotate relative to body 10 to accommodate different types of locks.

Connector 68 further includes cap 88 which is attached to base 70 and is larger in diameter than passage 58 and, therefore, rests on top 12 when base 70 is inserted in passage 58. A hook 90 is connected to cap 88 and extends away from axis 60 of opening 58 in the direction outwardly of end 18 of body 10. Hook 90 includes an upwardly facing channel 92 having an inner C-shaped surface 94 having an axis transverse to axis 28.

A lower connector designated generally by numeral 96 is slidably connected to extension 61 of body portion 10 for engaging second portion P2 of lock L to connect the lock to holder H and, in turn, to frame F. Connector 96 includes an inner end 98 disposed within passage 58 and an outer end 100 spaced apart therefrom by a cylindrical body portion 102. Body portion 102 has a diameter slightly less than the diameter of lower end 64 of passage 58 in extension 61 so that body portion 102 can slide freely in and out of passage 58. Inner end 98 comprises four circumferentially spaced apart fingers 104, 105, 106 and 107 extending axially away from body portion 102. Fingers 104, 105, 106, 107 have enlarged terminal ends 104a, 105a, 106a and 107a, respectively, which extend outwardly of body portion 102 to provide stop surfaces 104b, 105b, 106b and 107b which contact stop shoulder 66 in the lower portion of passage 58 to stop connector 96 from being removed from passage 58. As seen in FIGS. 3 and 4, an axially and radially extending gap 108 circumferentially separates finger 104 from 105 and similar gaps 109, 110 and 111 respectively separate finger 105 from finger 106, finger 106 from finger 107, and finger 107 from finger 104. Terminal ends 104a, 105a, 106a and 107a include beveled edges 104c, 105c, 106c and 107c, respectively, which edges facilitate the insertion of connector 96 into end 64 of passage 58 as will be described hereinafter.

Inner end 98 of body portion 102 includes a bore 120 for receiving a compression spring 122. Spring 122 extends from the bottom of bore 120 to base 70 of upper connector 68 and biases lower connector 96 away from upper connector 68. Spring 122 biases the stop surfaces 104b, 105b, 106b and 107b of fingers 104, 105, 106 and 107 against stop shoulder 66 in passage 58 which prevents lower connector 96 from being displaced from passage 58. Lower connector 96 further includes a portion 124 which extends away from body portion 102 and is integral with a downwardly facing lower hook 126 which is disposed beneath upper hook 90. Lower hook 126 includes a downwardly facing C-shaped inner channel 127 having an axis parallel to that of channel 92.

To attach lower connector 96 to body portion 10, spring 122 is inserted into passage 58 through end 64 until it abuts base 70 of upper connector 68. The lower end of spring 122 is then placed in bore 120 and connector 96 is brought toward lower end 64 until beveled edges 104c, 105c, 106c and 107c, of fingers 104, 105, 106 and 107 contact bottom wall 65 of extension 61. As the fingers are pressed against wall 65, they bend radially inwardly toward one another, guided by the angle of the beveled edges. This narrows the gaps 110, 111, 112 and 113 therebetween, whereby the fingers can pass through the narrow lower end of passage 58 until their terminal ends 104a, 105a, 106a and 107a, are past stop shoulder 66. The fingers then return to their original, parallel configuration. When pressure on lower connector 96 is released, spring 122 forces stop surfaces 104b, 105b, 106b and 107b against stop shoulder 66, biasing connector 96 away from upper connector 68. Body portion 102 of the lower connector slides freely in passage 58 and thus lower connector 96 can be easily moved toward upper connector 68 against the bias of spring 122.

Figure 5:
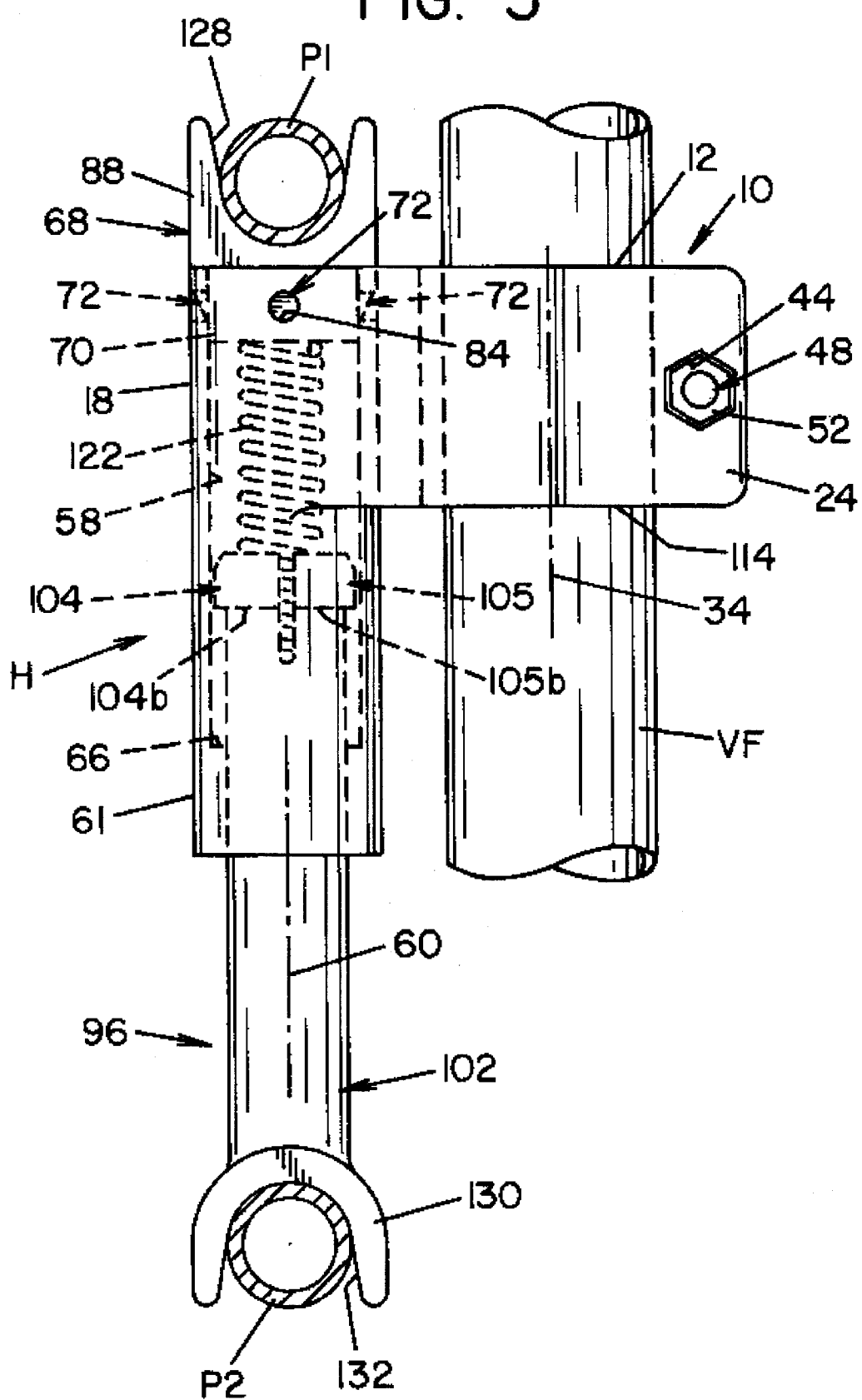
FIG. 5 is a side elevation view, partially in section, of a second embodiment of the holder of the present invention.

FIG. 5 shows a second embodiment of the subject invention wherein identical numerals are used to identify parts common to the first embodiment shown in FIGS. 1–4. As shown in FIG. 5, cap 88 of upper connector 68 has an upwardly facing channel 128 formed therein instead of in a hook spaced apart therefrom. In a similar manner, the bottom end of cylindrical body portion 102 of lower connector 96 has a hook 130 defining a C-shaped channel 132 aligned with channel 128 and disposed beneath extension 61 instead of being laterally displaced with respect thereto. This leads to a more compact holder than in the first embodiment.

FIGS. 6 and 7 show a third embodiment of the present invention wherein identical numerals are used to identify parts common to the above two embodiments. In this embodiment, cap 88 of upper connector 68 includes an elongated transverse arm 134 extending away from cap 88 parallel to centerline 28 but laterally spaced therefrom. Arm 134 terminates in an upwardly facing hook 136 having an arcuate channel 138 with centerline 140 perpendicular to and intersecting axis 60 and parallel to axis 28. Arm 134 and hook 136 define an open space 142 which receives a portion of lock L after it passes through hook 136.

In a similar manner, cylindrical body portion 102 of lower connector 96 also includes an elongated transverse arm 144 which extends away from body portion 102 and is parallel to and vertically spaced from upper arm 134. Arm 144 terminates in a downwardly facing hook 146 having an arcuate channel 148 having a centerline 150 perpendicular to and intersecting axis 60 and parallel to centerline 140 of channel 138. Arm 144 and hook 146 define an open space 152 which receives a portion of lock L after it passes through hook 146. Because the centerlines 140 and 150 of hooks 136 and 144 intersect axis 60 and are aligned with centerline 28 of body portion 10 in this embodiment, a lock L can be mounted to holder H such that lock L lies in a plane common to centerline 28 and axis 60. Thus, when mounted on a bicycle frame, holder H and lock L would be in a plane common to the axes of vertical frame portion VF and longitudinal frame portion LF in FIG. 1 instead of in a plane parallel thereto as in the first two embodiments.

All three embodiments are attached to a bicycle and used in a similar manner. To attached holder H to bicycle frame F, first jaw portion 22 and second jaw portion 24 of slotted end wall 20 are forced apart so that a portion of frame F can pass therebetween and into cylindrical opening 30. Bolt 48 is then passed through hole 42, across slot 26 and through hole 46, and nut 52 is connected thereto and tightened with respect to bolt 48 whereby jaw portions 22 and 24 of slotted end wall 20 are pulled toward one another as nut 52 is tightened. Nut 52 is tightened until opening 30 is compressed around a portion of frame F with sufficient force to hold holder H firmly in place. For the first and second embodiments, holder H is mounted to frame F so that centerline 28 is perpendicular to longitudinal portion LF of frame F. To attach the third embodiment of the holder to frame F, the holder is mounted with centerline 28 parallel to longitudinal frame portion LF.

To attach a lock L to holder H in all three embodiments portion P2 of lock L is placed in the lower hook of lower connector 96 and the connector is lifted relative to body portion 10, compressing spring 122 until portion P1 of lock L is disposed over the hook of upper connector 68. Lower connector 96 is then allowed to move away from body 10 until portion P1 is seated in the upper channel. Spring 122 biases lower connector 96 away from upper connector 68 with sufficient force that lock L is held firmly in place, even when the bicycle to which it is attached is traveling over rough terrain. Lock L is removed from holder H by reversing the above described steps.

The invention has been described with reference to three preferred embodiments and it is apparent that other embodiments as well as modifications of these preferred embodiments can be made without departing from the principles of the invention. Accordingly, it will be distinctly understood that the foregoing descriptive matter is to be interpreted merely as illustrative of the invention and not as a limitation thereof.

What is claimed is:

1. A bicycle accessory holder for attaching an accessory to a bicycle frame comprising a first portion defining a first open, U-shaped channel and a second portion defining a second open, U-shaped channel generally parallel to and facing away from said first channel, said first portion and said second portion being relatively displaceable from a first position for engaging the bicycle accessory to a second position for releasing the accessory, and biased away from one another; and attachment means for connecting said first portion and said second portion to the bicycle frame.

2. A holder according to claim 1, wherein said attachment means comprises jaw means for grasping a cylindrical portion of a bicycle frame and means for closing said jaw means about a bicycle frame.

3. A holder according to claim 2, wherein said jaw means comprises a pair of spaced apart jaws defining a circular interior space and said closing means comprises a bolt extending through each of said jaws and a nut attached to said bolt.

4. An accessory holder for releasably securing a bicycle accessory to a generally cylindrical support comprising:

a body section including a mounting opening for receiving a portion of the generally cylindrical support and a tubular portion having a central bore, said tubular portion being spaced away from said mounting opening;

first hook means defining a first channel and connected to said tubular portion for engaging a first portion of the accessory; and second hook means defining a second channel and slidably connected and biased away from to said tubular portion for engaging a second portion of the accessory.

5. A holder according to claim 4, wherein said first hook means channel faces in a first direction, and said second hook means channel faces away from said first hook means.

6. A holder according to claim 5, wherein said second hook means is movable between a first position for engaging an accessory and a second position for disengaging said accessory.

7. A holder according to claim 6, including spring means for biasing said second hook means toward said first position.

8. A holder according to claim 10, wherein said body section includes means for constricting said opening.

9. A holder according to claim 4, wherein said second hook means includes a cylindrical portion for slidably engaging said central bore and stop means for retaining said cylindrical portion within said central bore.

10. An accessory holder for releasably securing a bicycle accessory to a generally cylindrical support comprising:

a body section including a mounting opening for receiving a portion of the generally cylindrical support end a tubular portion having a central bore, said tubular portion being spaced away from said mounting opening;

first hook means connected to said tubular portion for engaging a first portion of the accessory and defining a channel facing in a first direction;

second hook means slidably connected to said tubular portion for engaging a second portion of the accessory and defining a channel facing in a second direction, said first direction being generally opposite said second direction; and, spring means for biasing said second hook means away from said first hook means comprising a compression spring disposes between said first hook means and said second hook means.

11. A bicycle lock holder attachable to a bicycle frame comprising:

a body portion including attachment means for fastening said body portion to said frame and a bore spaced from said attachment means and having opposite ends;

first holder means having an end portion connected in said bore at one of said ends and a first arcuate channel having an axis for receiving a first portion of a bicycle lock;

second holder means having an end portion disposed within said bore at the other of said ends for sliding engagement with said bore and a second arcuate channel having an axis for receiving a second portion of said lock, said second channel facing away from said first channel; and said second holder means being movable between a first position for engaging said lock in which said second channel is separated from said first channel by a first distance and a second position for releasing said lock in which said second channel is separated from said first channel by a second distance, said second distance being less than said first distance.

12. A lock holder according to claim 11, including spring means for biasing said second holder toward said first position.

13. A lock holder according to claim 12, wherein said body portion includes an opening between said attachment means and said bore.

14. A lock holder according to claim 12, wherein said bore and said second holder means include retaining means for retaining said end portion of said second holder means in said bore.

15. A lock holder according to claim 14, wherein said retaining means comprises shoulder means in said bore adjacent said other end of said bore.

16. A lock holder according to claim 15, wherein said retaining means further comprises stop means on said end portion of said second holder means for cooperating with said shoulder means in said central bore.

17. A lock holder according to claim 16, wherein said stop means comprises a plurality of fingers attached to said end portion of said second holder means.

18. A lock holder according to claim 12, wherein said bore has a bore axis, said attachment means comprises a passage having a passage axis parallel to said bore axis, and said body portion includes a top wall having a centerline perpendicular to and intersecting both said bore and passage axes.

19. A lock holder according to claim 18, wherein said first channel axis and said second channel axis are perpendicular to said bore axis and said centerline.

20. A lock holder according to claim 19, wherein said first channel axis and said second channel axis intersect said bore axis.

21. A lock holder according to claim 18, wherein said first and second channel axes are parallel to said centerline.

22. A lock holder according to claim 21, wherein said channel axes intersect said bore axis.

23. A lock holder according to claim 18, wherein said bicycle frame lies in a first plane, and said first and second channel axes lie in a second plane parallel to said first plane.

24. A lock holder according to claim 23, wherein said channel axes intersect said bore axis.

25. A lock holder according to claim 18, wherein said bicycle frame, said centerline and said channel axes lie in a single plane.

26. A bicycle lock holder for attaching an accessory to a bicycle frame comprising:

a body portion having a top and a bottom and a first cylindrical opening for receiving a portion of the bicycle frame, said first cylindrical opening having an axis and defining a pair of spaced apart jaws, closing means for holding said jaws together around said portion of the bicycle frame, a second cylindrical opening laterally spaced from said first opening, a body section depending from said bottom of said body portion, said second cylindrical opening extending from said top of said body portion through said body section, said second opening having an axis and top and bottom ends;

first hook means for engaging a first portion of said lock, said first hook means comprising a first end received in said top end of said second opening and a cap portion connected to said first end and resting on said body portion top, said cap portion including a first hook facing in a first direction away from said first end of said second cylindrical opening;

second hook means for engaging a second portion of said lock, said second hook means comprising a cylindrical section received in said bottom end of said second opening in sliding engagement with said second opening, said second hook means further including a second hook on said cylindrical section outwardly of said second end of said second opening, said second hook facing away from said second end of said second opening, and stop means for limiting displacement of said second hook means in said direction away from said second end of said second opening; and spring means for biasing said second hook means in said direction away from said second end.

27. The holder of claim 26, wherein said second hook means is movable between a first position for engaging a bicycle lock and a second position for releasing said lock.

28. A bicycle lock holder according to claim 26, wherein said body portion has a top wall having a centerline perpendicular to and intersecting said first and second opening axes, said first hook means comprises a channel facing in said first direction and having a first channel axis, said second hook means comprises a channel facing away from said first channel in a second direction and having a second channel axis parallel to said first channel axis.

29. A bicycle lock holder according to claim 29, wherein said first channel axis and said second axis are parallel and co-planar and lie in a plane normal to said centerline.

30. A bicycle lock holder according to claim 29, wherein said first channel axis and said second channel axis intersect said second opening axis at right angles.

31. A bicycle lock holder according to claim 28, wherein said centerline lies in a first channel plane, said first axis and said second channel axis are parallel and lie in a second plane parallel to said first plane.

32. A bicycle lock holder according to claim 28, wherein said first axis, second axis and centerline are parallel and co-planar.

33. A bicycle lock holder according to claim 26, wherein said second cylindrical opening includes a stop shoulder spaced from said bottom end and has a first diameter between said top end and said stop shoulder and a second diameter between said stop shoulder and said bottom end, said second diameter being less than said first diameter.

34. A bicycle lock holder according to claim 23, wherein said cylindrical section of said second hook means has an inner end and said stop means comprises a plurality of fingers extending from said inner end for engaging said stop shoulder.

35. A bicycle lock holder according to claim 34, including first arm means on said first hook means for spacing said first hook from said cap, and second arm means on said second hook means for spacing said second hook from said cylindrical section.

* * * * *